(12) United States Patent
Ballew

(10) Patent No.: US 10,768,519 B1
(45) Date of Patent: Sep. 8, 2020

(54) OVERHEAD FRAME CORNERS FOR MOTION PICTURE AND STILL PHOTOGRAPHY

(71) Applicant: Tony Jay Ballew, Livingston, MT (US)

(72) Inventor: Tony Jay Ballew, Livingston, MT (US)

( * ) Notice: Subject to any disclaimer, the term of this patent is extended or adjusted under 35 U.S.C. 154(b) by 0 days.

(21) Appl. No.: 16/035,352

(22) Filed: Jul. 13, 2018

Related U.S. Application Data

(60) Provisional application No. 62/532,191, filed on Jul. 13, 2017, provisional application No. 62/579,123, filed on Oct. 30, 2017, provisional application No. 62/580,041, filed on Nov. 1, 2017, provisional application No. 62/610,277, filed on Dec. 26, 2017.

(51) Int. Cl.
    *G03B 21/64* (2006.01)
    *A47G 1/10* (2006.01)
    *G03B 21/30* (2006.01)
    *G03B 21/32* (2006.01)

(52) U.S. Cl.
    CPC .............. *G03B 21/64* (2013.01); *A47G 1/10* (2013.01); *G03B 21/30* (2013.01); *G03B 21/32* (2013.01)

(58) Field of Classification Search
    CPC ........... G03B 21/30; A47G 1/10; B44D 3/185
    USPC ....... 40/605, 739, 741, 780, 784; 160/374.1; 38/102.8, 102.9
    See application file for complete search history.

(56) References Cited

U.S. PATENT DOCUMENTS

| | | | | |
|---|---|---|---|---|
| 3,583,466 A | * | 6/1971 | Dreyer | G03B 21/58 160/351 |
| 4,785,565 A | * | 11/1988 | Kuffner | A47F 5/105 160/135 |
| 5,493,800 A | * | 2/1996 | Chinitz | B41F 15/36 160/381 |
| 5,621,994 A | * | 4/1997 | Cobb | G09F 15/0012 40/605 |
| 8,020,328 B2 | * | 9/2011 | Lavi | A47B 47/0016 40/605 |

* cited by examiner

*Primary Examiner* — Joanne Silbermann

(57) ABSTRACT

Improved corners for overhead frames having primary and secondary fasteners that are located within the distal rectangular periphery of alpha oriented overhead frame components so that the width of bundled overhead frames is reduced; protrusions leading to snagging are eliminated; and the preferred, industry-wide, disassembled frame orientation is maintained.

2 Claims, 16 Drawing Sheets

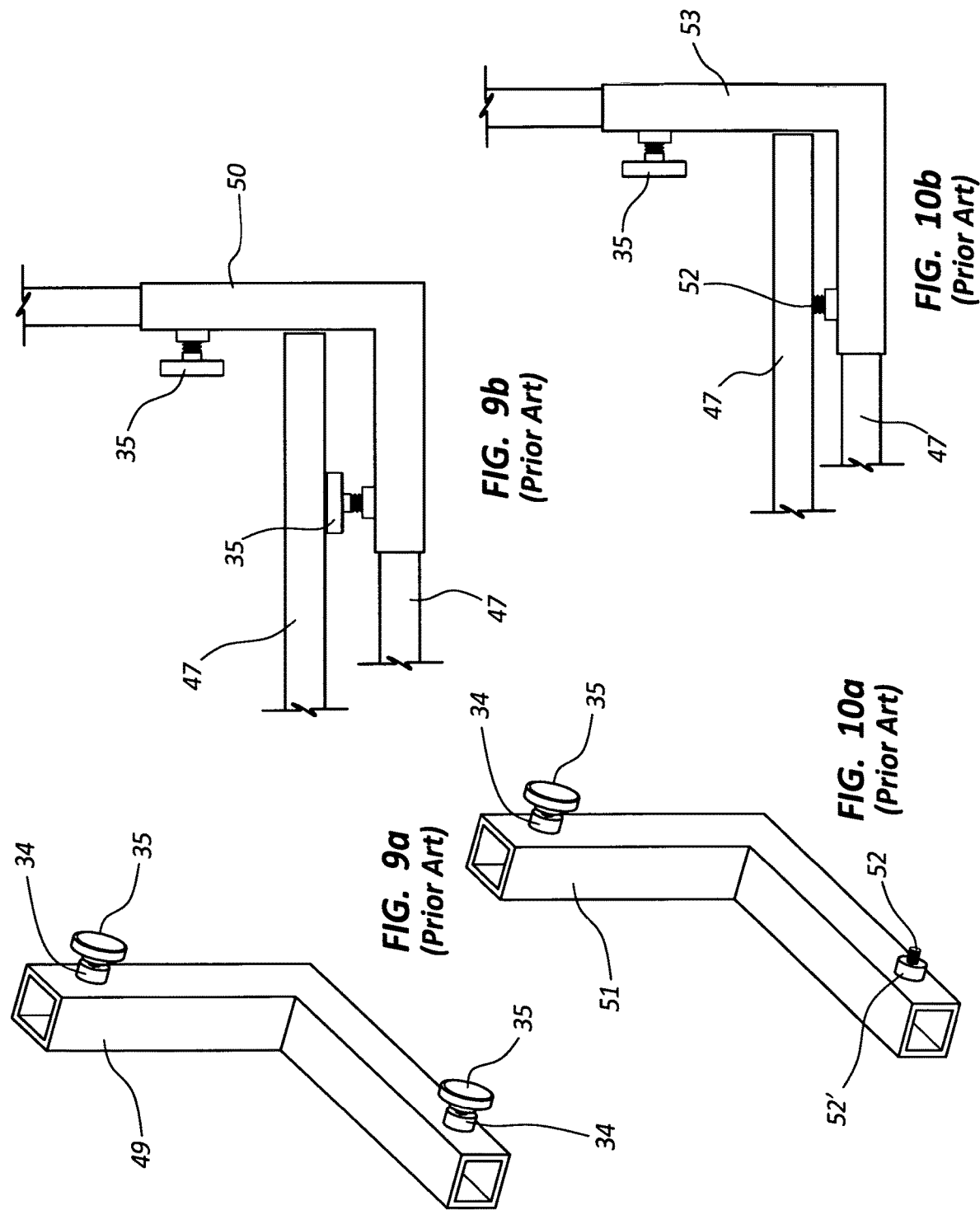

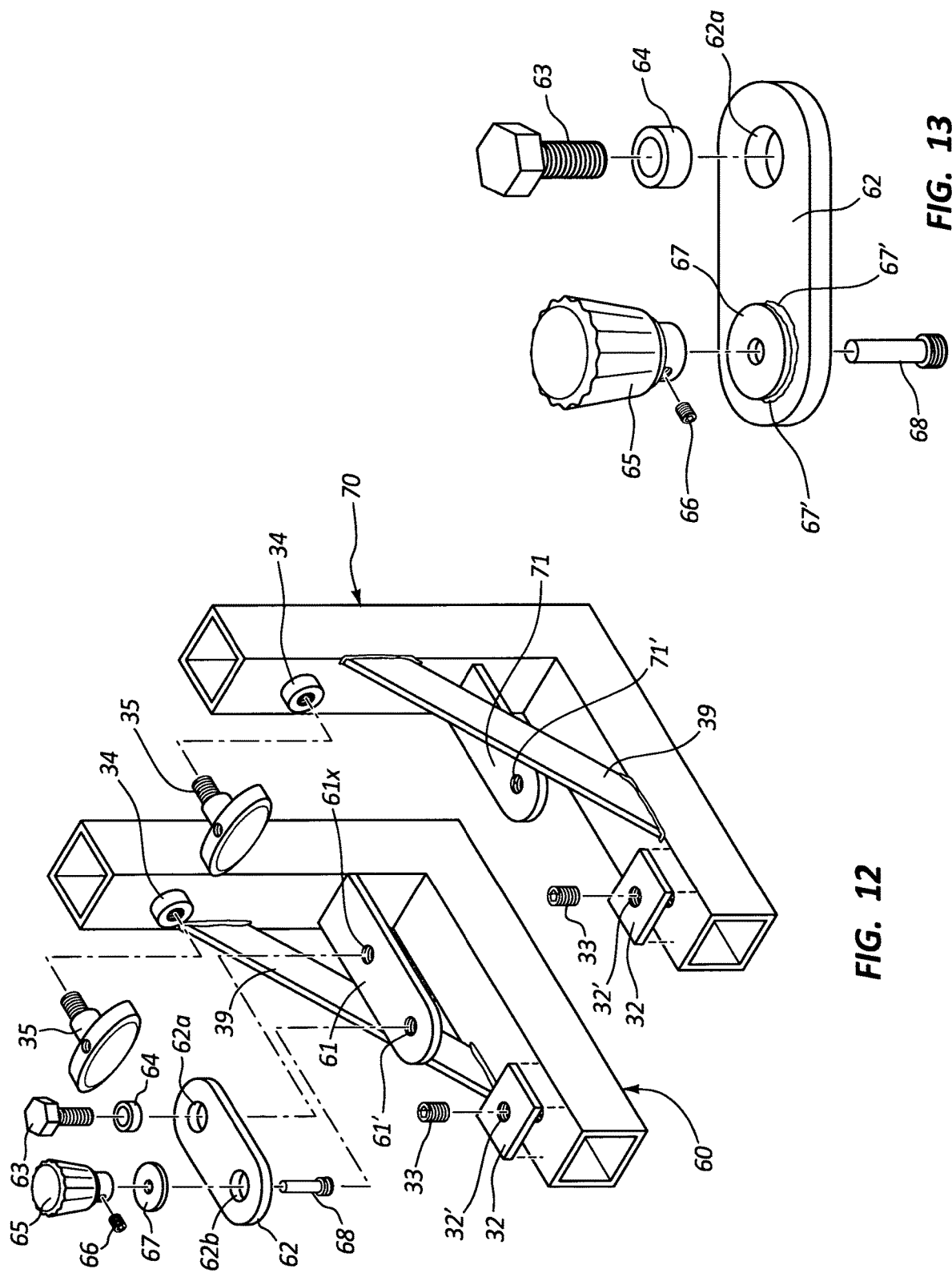

OVERHEAD FRAME CORNERS FOR MOTION PICTURE AND STILL PHOTOGRAPHY

CROSS-REFERENCE TO RELATED APPLICATIONS

Figure 1:
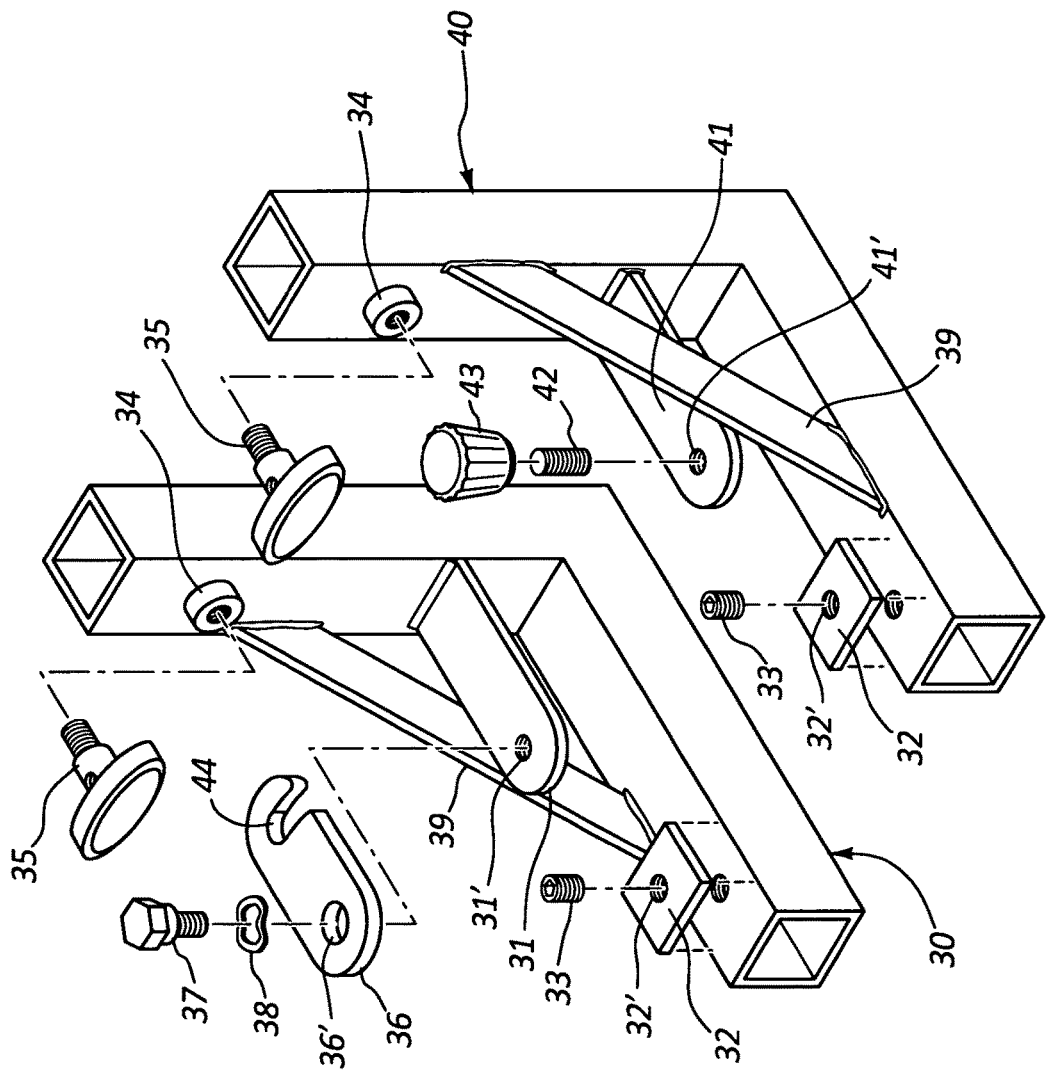

This application claims the benefit of multiple provisional patent applications:
Application No. 62/532,191 filed Jul. 13, 2017;
Application No. 62/579,123 filed Oct. 30, 2017;
Application No. 62/580,041 filed Nov. 1, 2017; and
Application No. 62/610,277 filed Dec. 26, 2017; all filed by applicant, Tony Ballew, Inventor.

FEDERALLY SPONSORED RESEARCH

Not Applicable

SEQUENCE LISTING OR PROGRAM

Not Applicable

BACKGROUND OF THE INVENTION

Field of Invention

This invention relates to motion picture and still photography equipment, specifically to corners for overhead frames.

BACKGROUND OF THE INVENTION

Prior Art

Note: This analysis of the prior art will reference the drawing figures of the present invention. It will become apparent that the exact orientation of specifically configured overhead frame components described for the prior art is not only identical to that of the present invention, but also intentional.

Overhead frames have been used in the motion picture industry for decades. Various materials are tied into the frame to diffuse, reduce, cut, or bounce light. Typical frames comprise four sides of steel, alloy, or aluminum square tubing; four corner structures, or corners, to hold the sides in a square or rectangular shape on a single plane; two movable ears with which to suspend the frame; and one or more component fastener types with which to secure the frame components. One fastener type, the primary fastener, secures the corners and ears to the sides of the frame when assembled, as in FIG. 3 of the present invention. Primary fasteners comprise set screws and T-handle bolts. The socket head set screws or T-handle tension bolts are threaded into nuts affixed to the ears and corners. Another type fastener, the secondary fastener, is a recent development that rigidly secures frame components in a specific orientation when disassembled. Currently, this secondary fastener type is known to be used on only one manufacturer's prior art overhead frame.

Overhead frames are usually disassembled for ease of storage and reassembled for use. Two prevalent degrees of disassembly, noted here as full disassembly and minimal disassembly, are uniformly employed throughout the industry. In both disassembly configurations, the set screws and T-handle bolts remain at least partially threaded into the ears and corners to expedite reassembly.

With full disassembly, the four corners and two ears are completely removed from the sides and stored separately. The four sides are usually bundled together with materials such as tape, strings, or hook and loop straps. Full disassembly results in ten component pieces.

Figure 4:
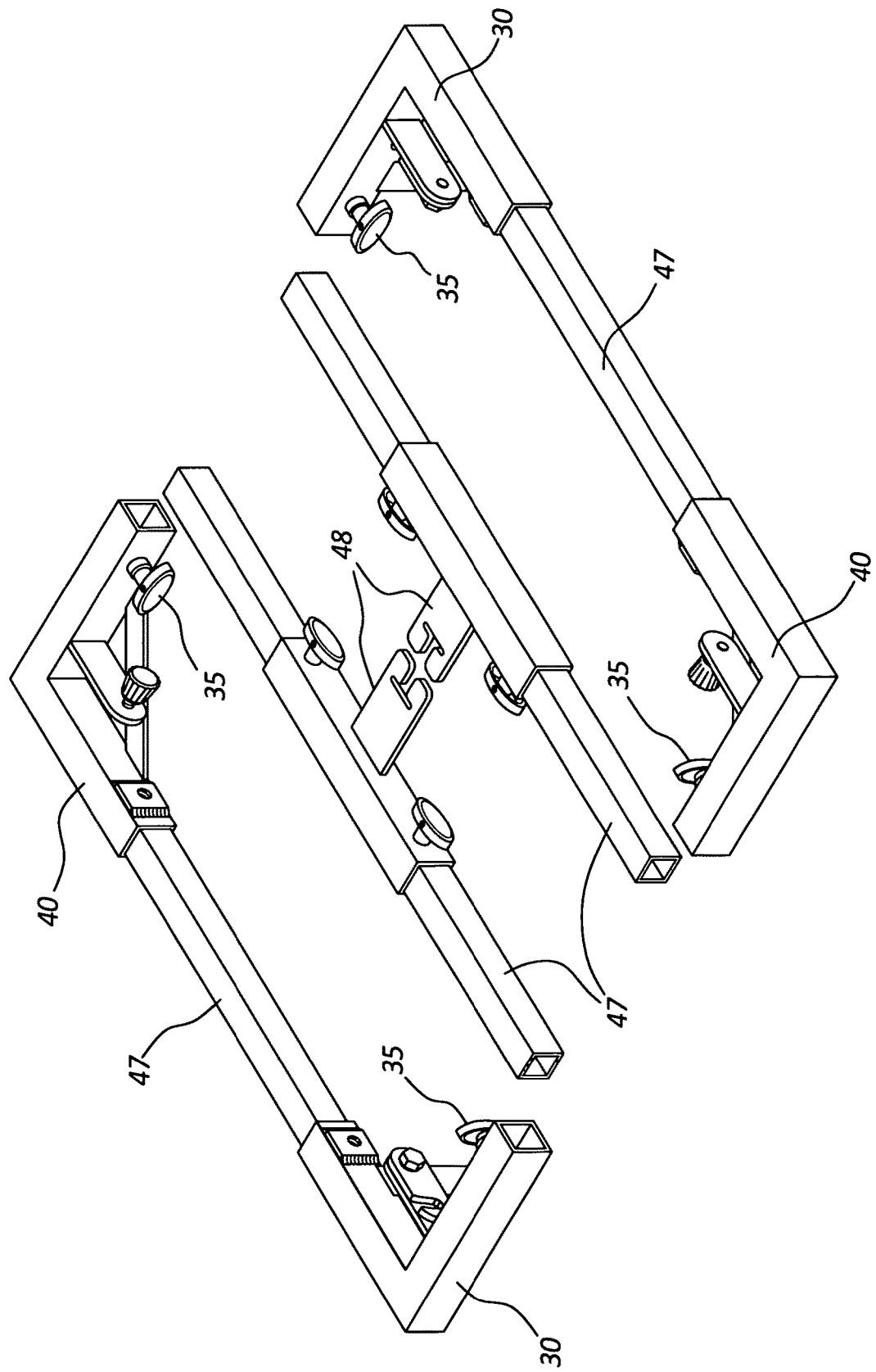

With minimal disassembly, the corners and ears remain attached to the sides in a specific fashion, as shown in FIG. 4 of the present invention. The corners are left attached at each end of two sides. Ears are left attached to the remaining two sides. This minimal disassembly, herein referred to as the "prime configuration," results in four component pieces.

Figure 5:
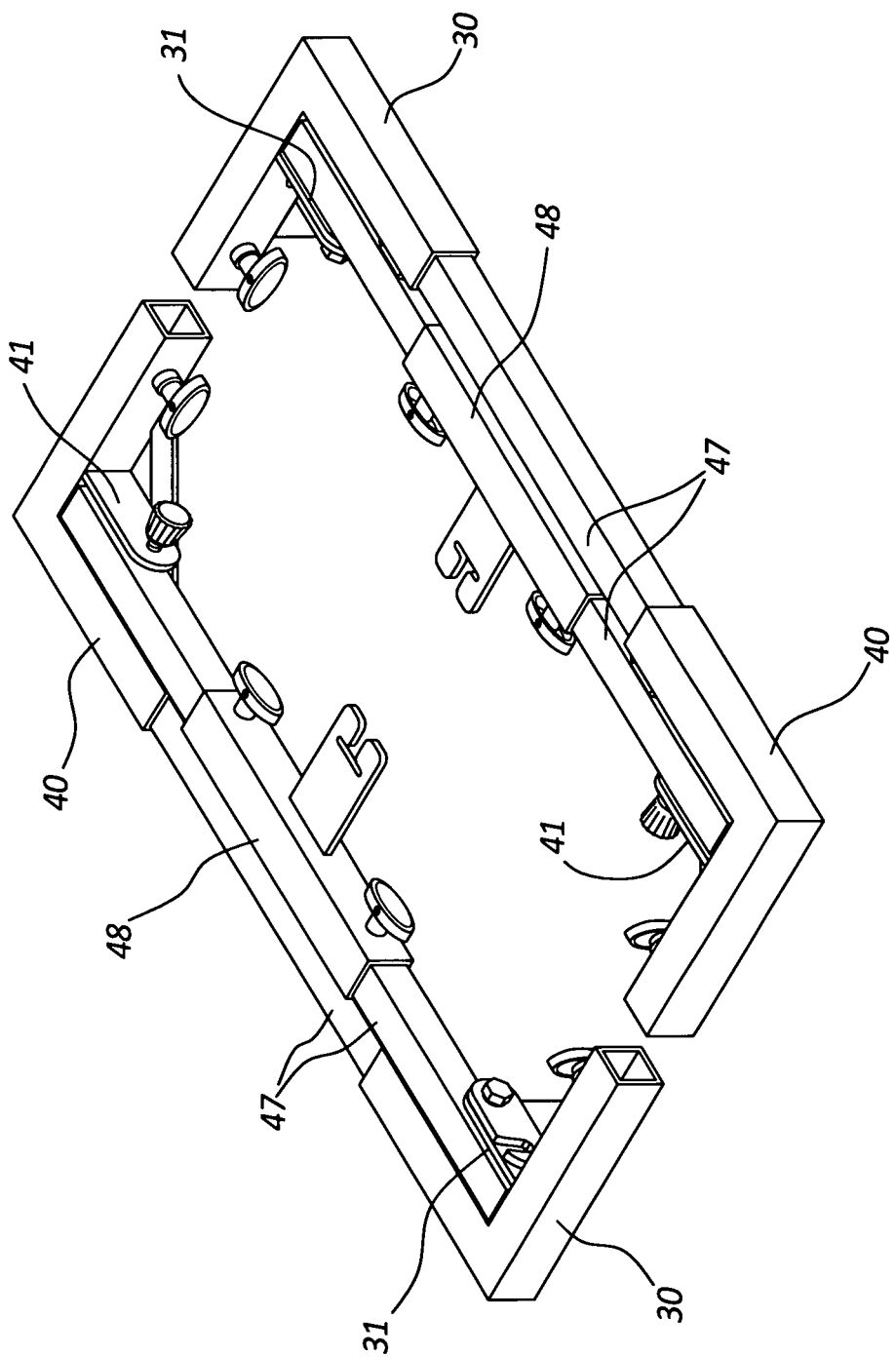

To further prepare prime-configured components for storage, a specific orientation is used. To achieve a compact bundle with minimal space between components, the sides with ears, or the "swing sides," are placed between the corners, as in FIG. 5 of the present invention. (Note that retainers 31 and 41 of FIG. 5 are non-existent in the prior art.) Placement of each swing side between corners results in two complete half-frames. The two half-frames are then positioned in a side by side orientation, as in FIG. 6. When the two frame halves are moved into closest adjacent proximity, the four sides are found in a relative position to one another that is substantially square in cross-sectional profile (seen in FIG. 2), and thus creates a bundle whose outer or distal frame peripheries form a three-dimensional rectangular shape, as indicated by the broken lines of FIG. 6 of the present invention. This specific orientation places frame components into the most compact and positionally stable arrangement possible. It is herein referred to as the "alpha orientation." This alpha-oriented bundle is then secured with materials such as string, tape, or hook and loop straps.

The benefits of minimal disassembly, or prime configuration, over full disassembly are realized by reduction in assembly and disassembly times. In addition, the various components are stored together, thus eliminating multiple component locations and possible misplacement. Despite the cumulative advantages of prime-configured components in an alpha orientation, until now, substantial disadvantages have persisted.

Figure 11:
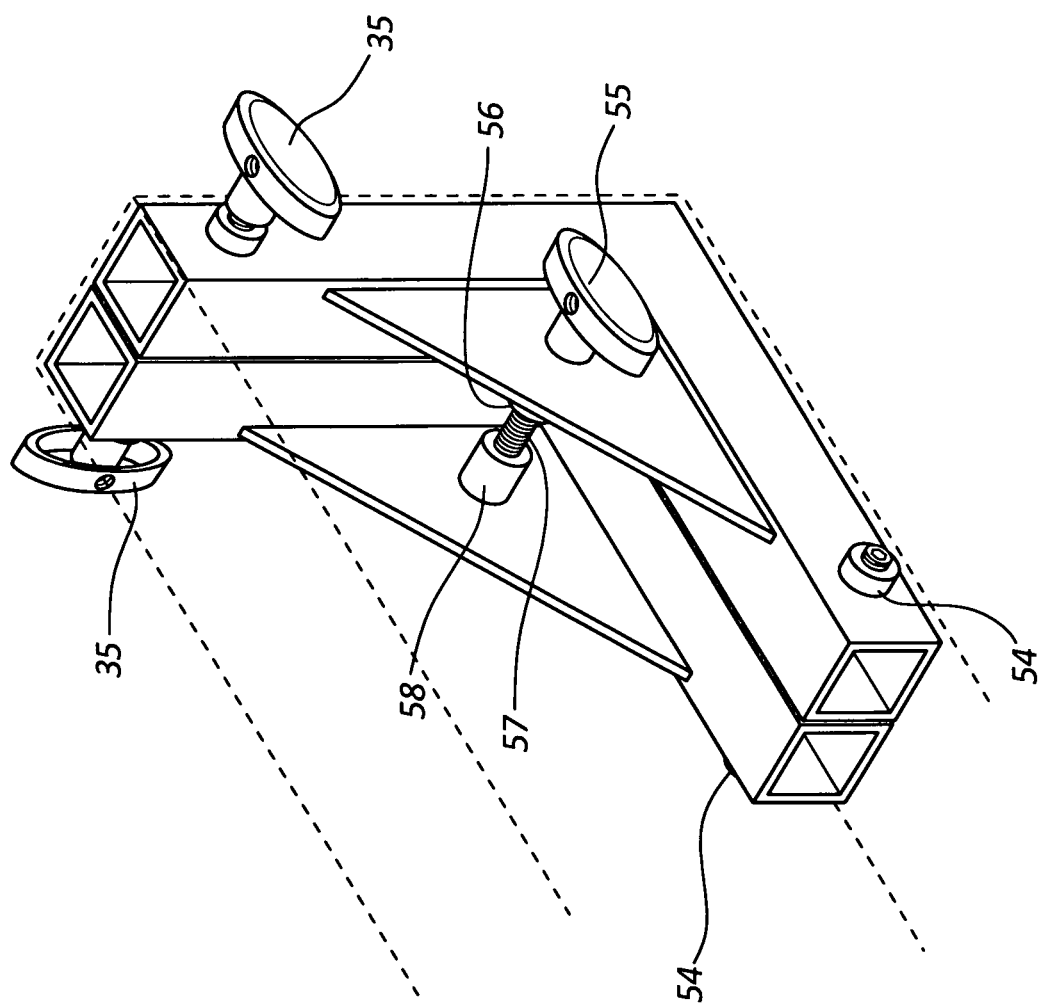

The main disadvantages of the alpha orientation in regard to the prior art corners are found in various aspects of the primary and secondary fasteners. The typical, prior art centerline orientation of the corner's primary set screws and T-handle bolts is seen in FIGS. 9a, 10a, and 11, and is perpendicular to the plane of an assembled frame. For components in the alpha orientation, this centerline orientation places the T-handles and set screws outside of the distal rectangular peripheries of the bundled frame, as shown by the broken lines in FIG. 11, thus substantially increasing the frame's effective bundled width. This increased width often more than doubles the space needed for storage. These perpendicular T-handle and set screw orientations also create unwanted protrusions that snag on other frames when removing only one frame from among many in close proximity. The issue of snagging is especially pronounced when sliding bundled frames onto a shelf from the shelf's end, as is regularly encountered in equipment rental facilities or on motion picture equipment trucks. Attempts at simply repositioning T-handle bolt or set screw orientations in order to overcome these disadvantages only complicate component bundling into the alpha orientation, and thus create a different set of disadvantages, as discussed next.

Due to the simplicity of overhead frames, there have been few improvements. American® is one of many manufacturers who offer corners with perpendicularly oriented T-handle centerlines, seen in FIG. 9a. American® also offers optional corners with repositioned T-handle centerlines, FIG. 9b. This optional T-handle repositioning does reduce the overall width of corners. However, simply repositioning T-handles in this manner creates an obstruction which disallows alpha orientation by requiring that the swing sides be positioned on top of the lower T-handles, as shown in FIG. 9b. Such repositioning creates an awkward situation and difficulty while attempting to tie or tape the bundle. In addition, the increased height of the bundle is positionally unstable and easily compromised when tied in usual fashion.

Along with other manufacturers, American® now also offers corners with set screws at locations not requiring disassembly in a prime configuration. The set screws and T-handles are pictured in their literature as employing only centerline orientations perpendicular to the assembled frame's plane, as seen in FIG. 10a. Currently, there are no known corners whose set screw orientations deviate from this perpendicular orientation. In the event that set screws and T-handles were repositioned as in FIG. 10b, an obstruction would again be created, thus disallowing alpha orientation. Balancing sides on top of such repositioned lower set screws or set screw nuts while attempting to tie or secure the bundle promises to be an awkward ordeal, leading to an insecure, positionally unstable bundle arrangement even when tied.

One substantial frame improvement is the Hollywood overhead frame, FIG. 11, manufactured by Matthews Studio Equipment®. For its primary fasteners, the Hollywood corners use typical T-handle bolt and socket head set screw centerlines oriented perpendicularly to the plane of the assembled frame. These corners therefore do not restrict alpha component orientation. The improvement of this frame is found in its secondary fasteners. These secondary fasteners comprise a latch apparatus of specifically placed T-handle bolts and nuts which retains and secures alpha-oriented frame components in rigid fashion, thereby eliminating cumbersome, wasteful, and time-consuming use of materials such as tape, strings, or hook and loop straps. Even with its advantages, however, this frame not only retains the noted disadvantages regarding the perpendicular centerline orientation of its set screws and T-handle bolts, but also relies upon that orientation for its latch apparatus. The broken lines of FIG. 11 illustrate the primary and secondary fasteners protruding beyond the distal rectangular frame peripheries of its alpha-oriented frame.

BACKGROUND OF THE INVENTION

Objects and Advantages

Accordingly, several objects and advantages of the present invention are
(a) to provide secondary fasteners that eliminate the use of temporary, cumbersome, or inefficient materials such as tape, strings, or hook and loop straps;
(b) to provide secondary fasteners that allow positionally stable, secure bundling of frame components in the alpha orientation;
(c) to provide secondary fasteners that eliminate protrusions which complicate stowage and retrieval of a frame when bundled into the alpha orientation; and
(d) to provide secondary fasteners that reduce the space required for storage of a frame when bundled in the alpha orientation.

SUMMARY

In accordance with the present invention, overhead frame corners with improvements comprising secondary fasteners that are positioned within the distal rectangular periphery of prime-configured overhead frame components in the alpha orientation, whereby alpha-oriented frames may be bundled in rigid fashion, protrusions from alpha-oriented frames are eliminated, and width of alpha-oriented frames is reduced.

DRAWINGS—FIGURES

Figure 2:
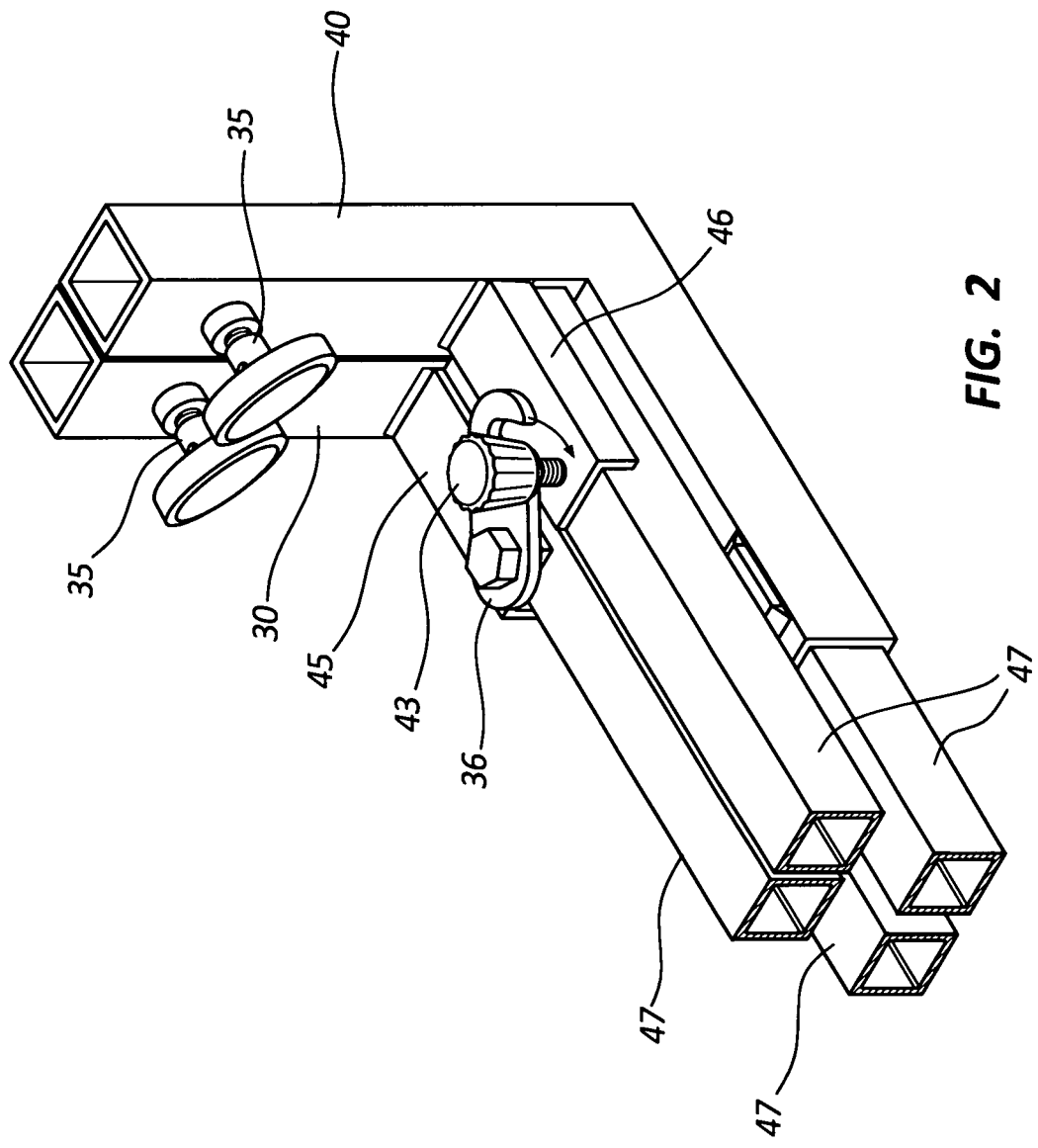
Figure 3:
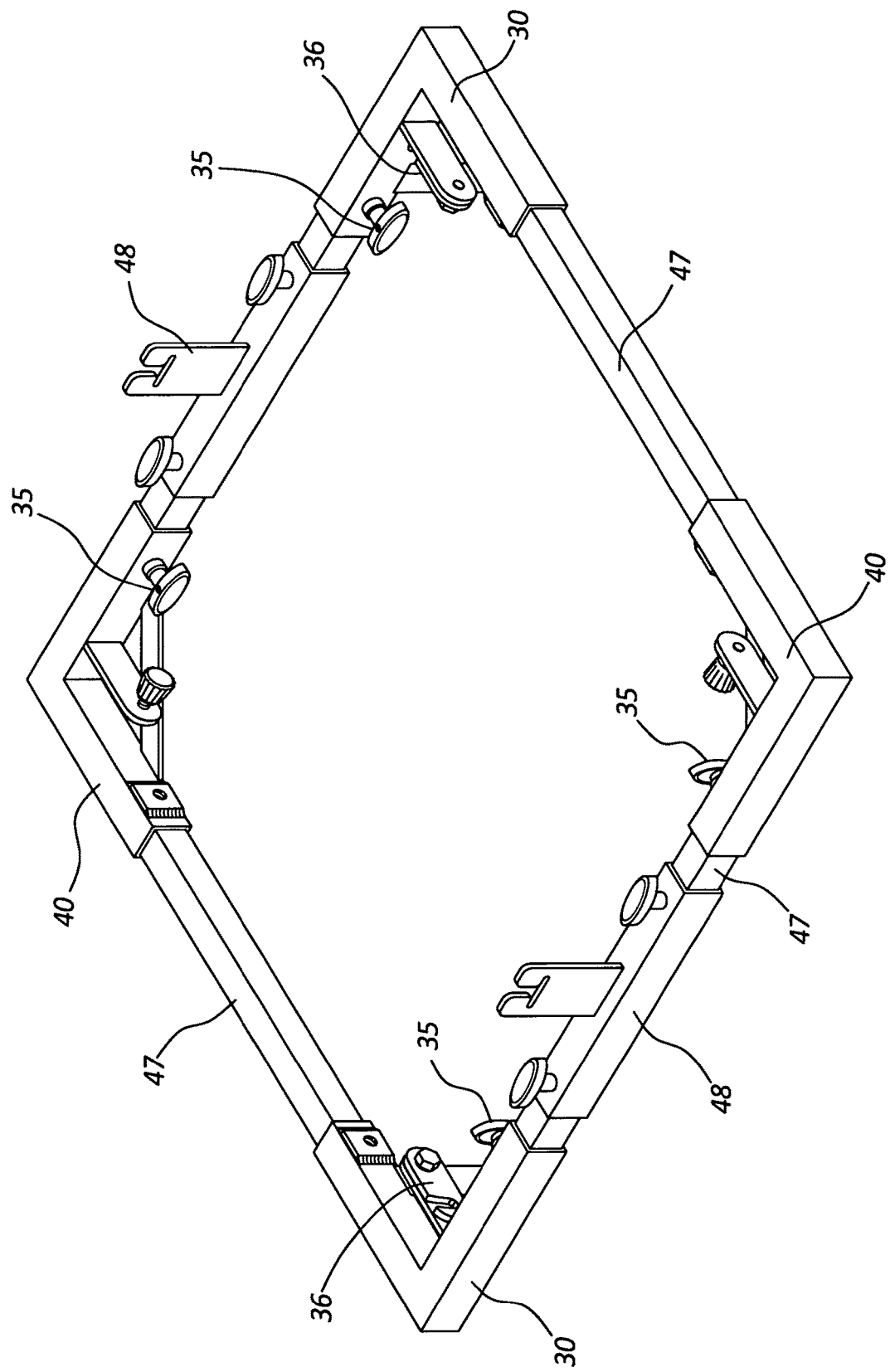
Figure 6:
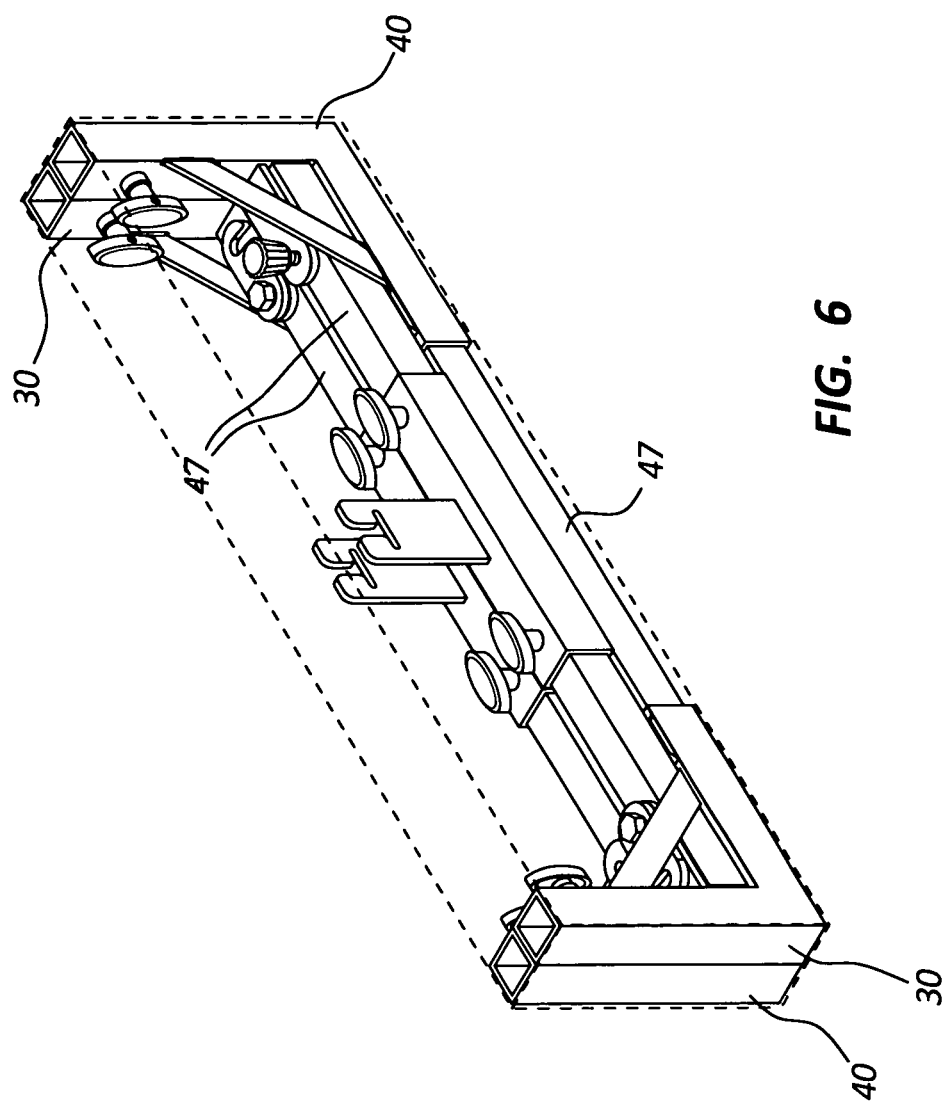
Figure 8:
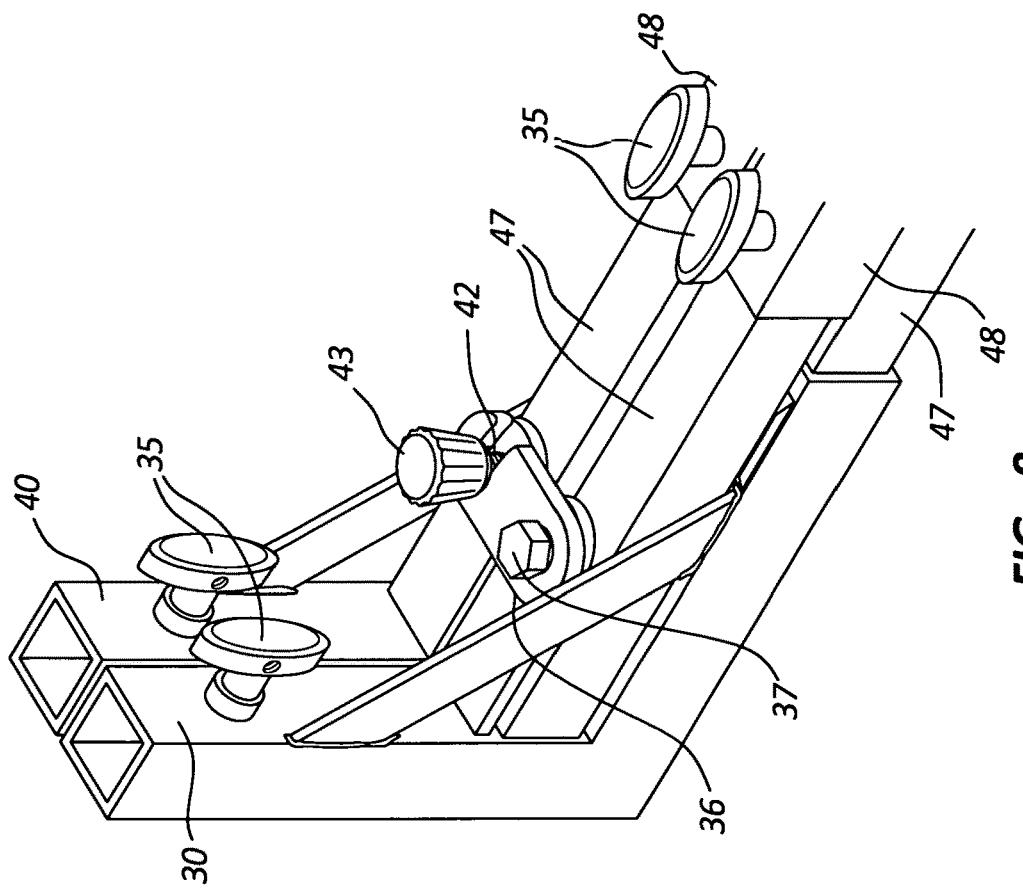
Figure 7:
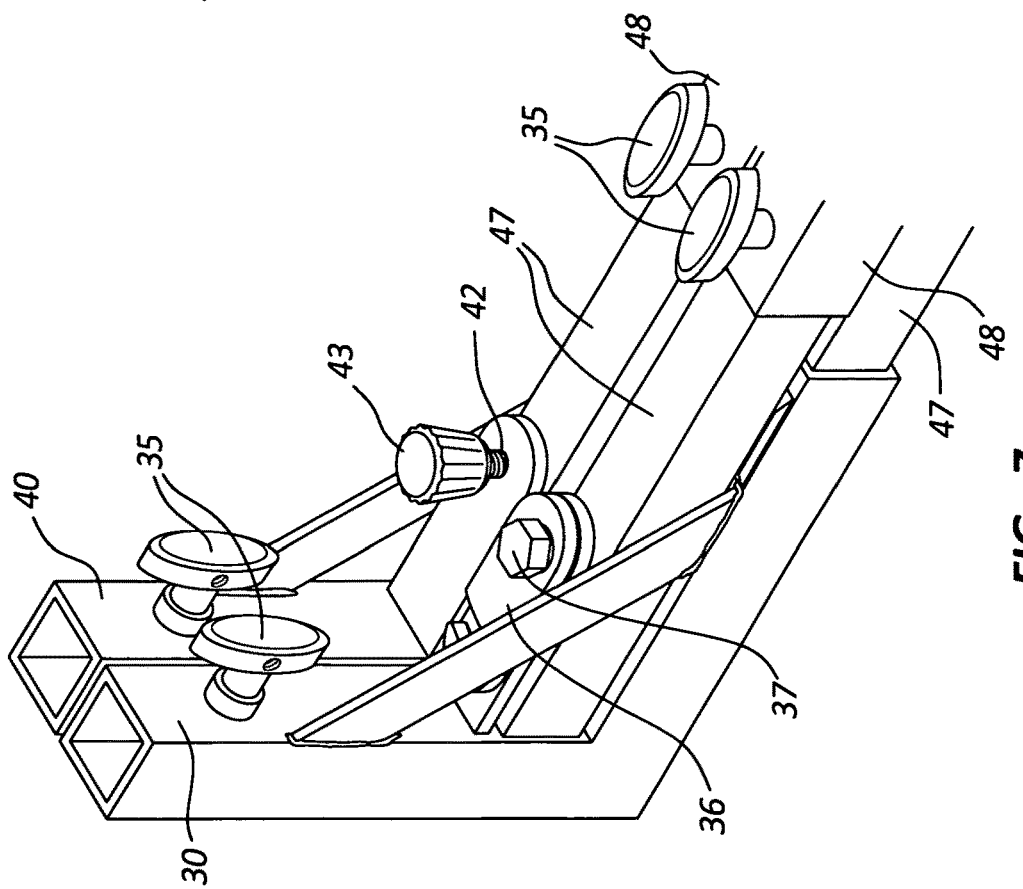
Figure 15:
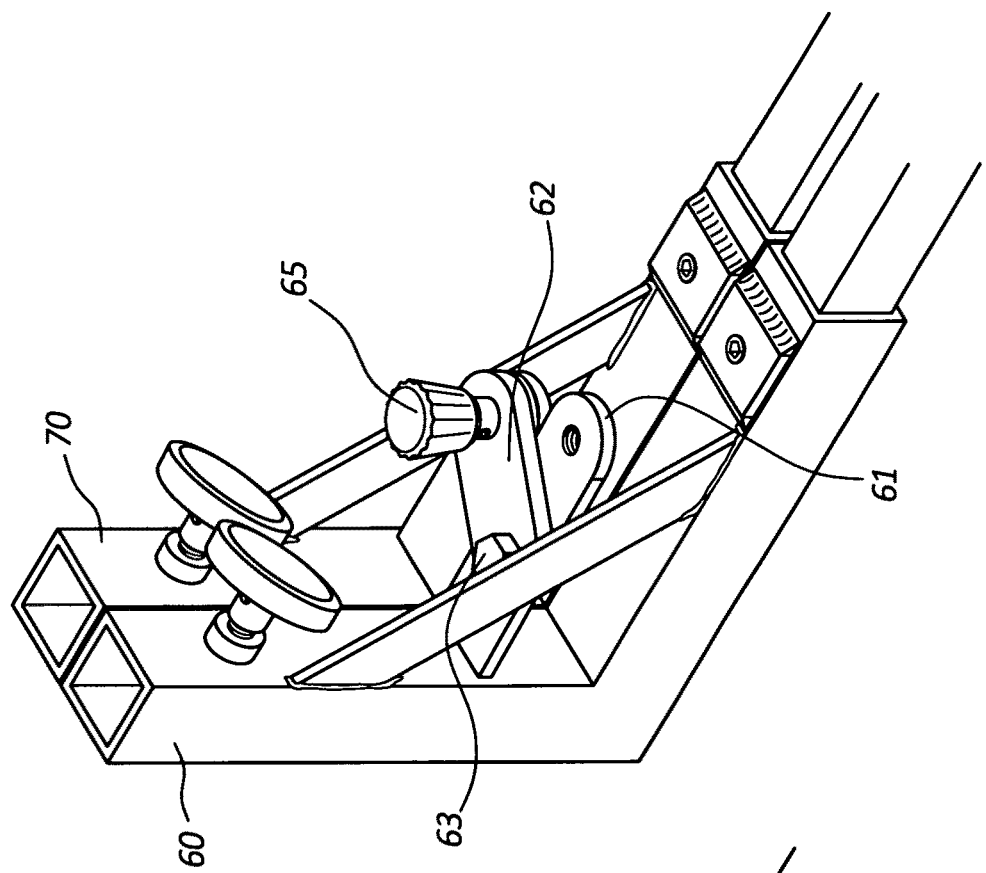
Figure 14:
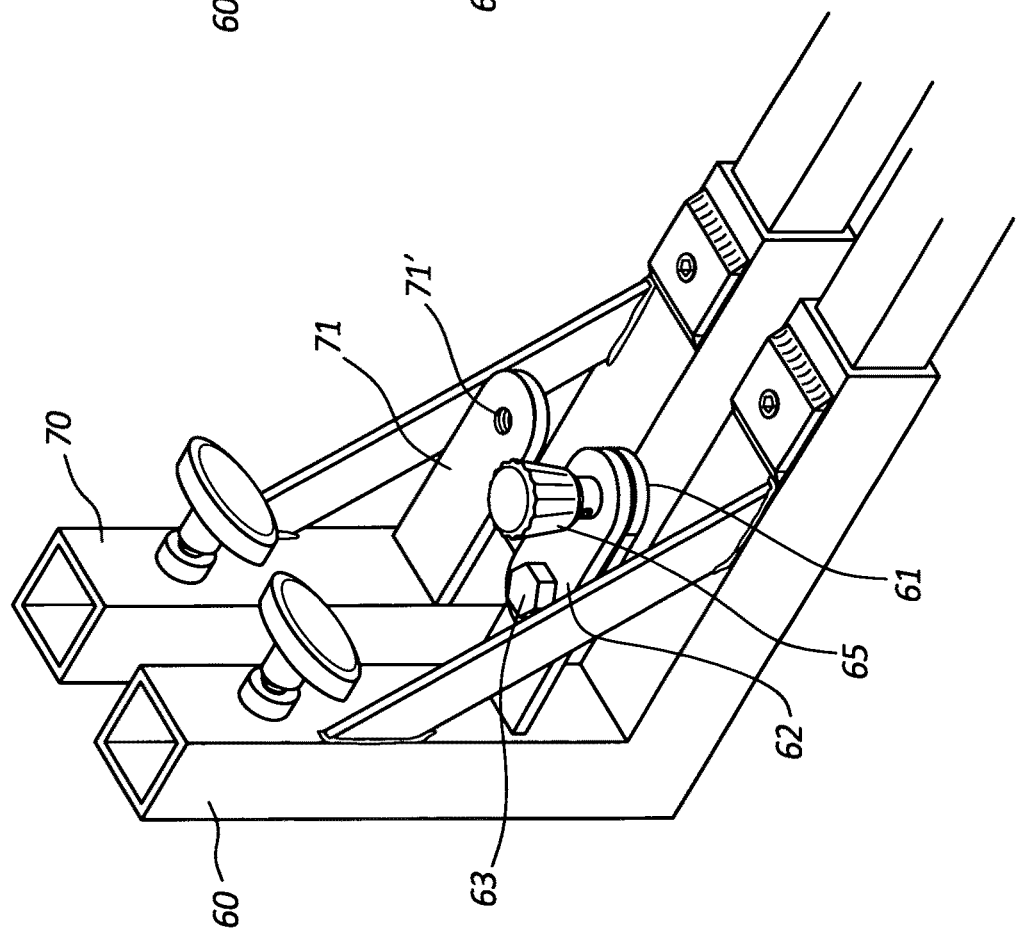
Figure 16:
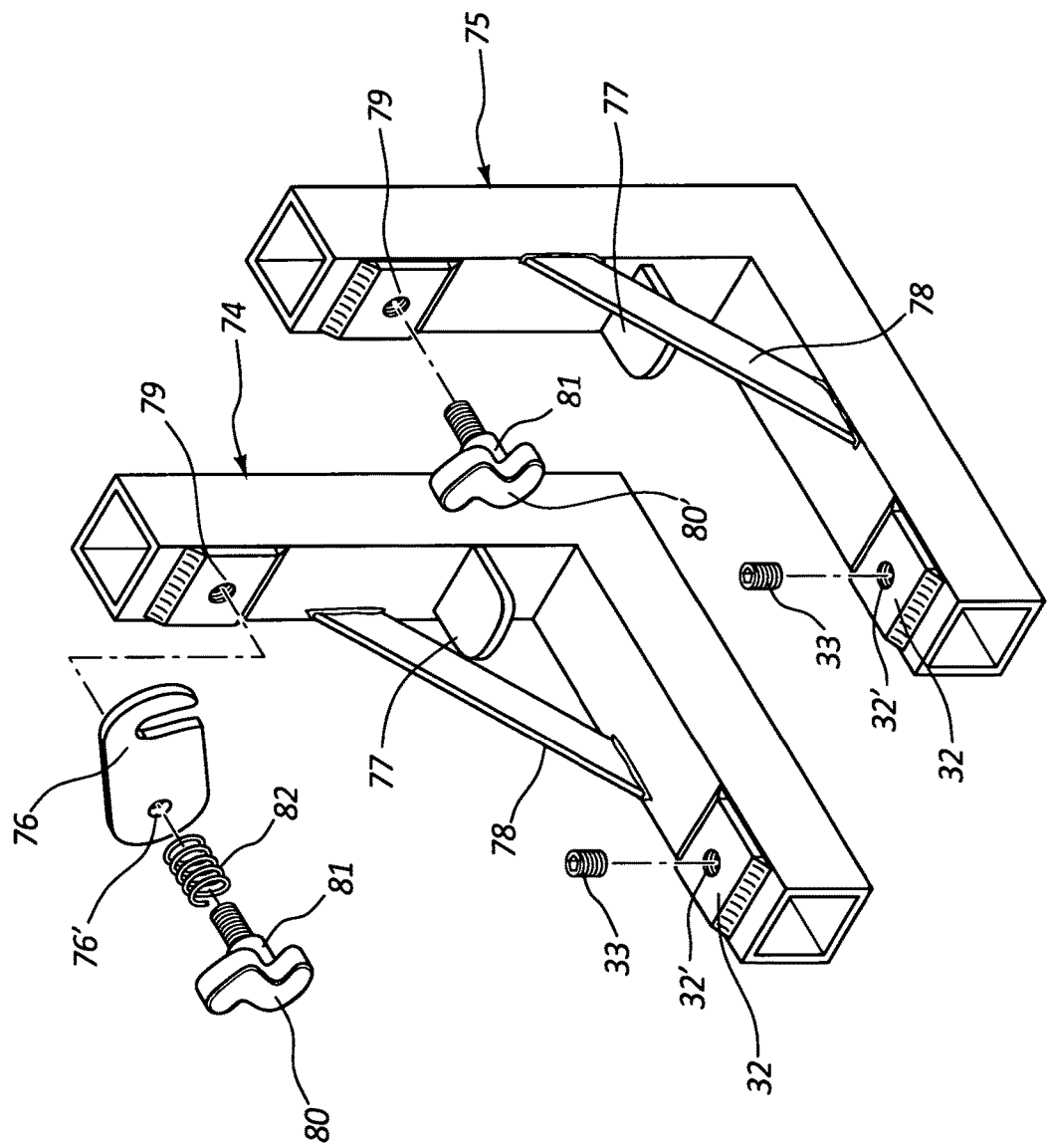
Figure 18:
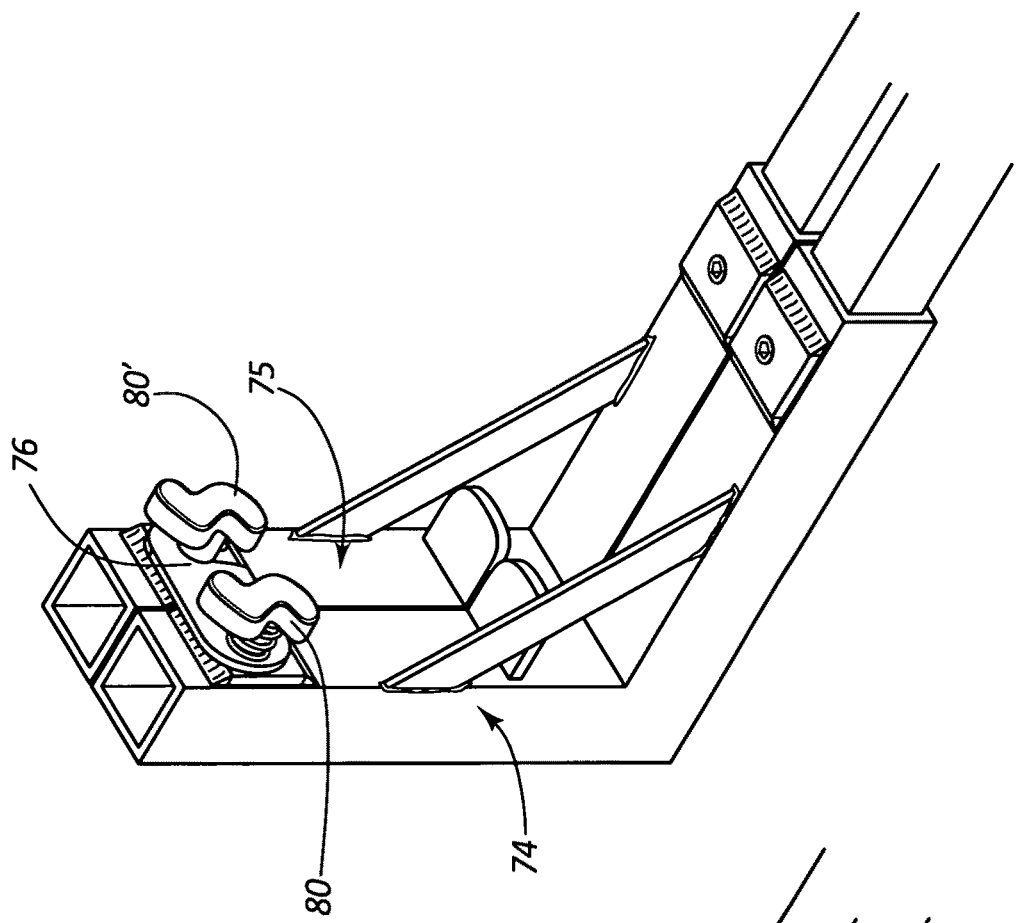
Figure 17:
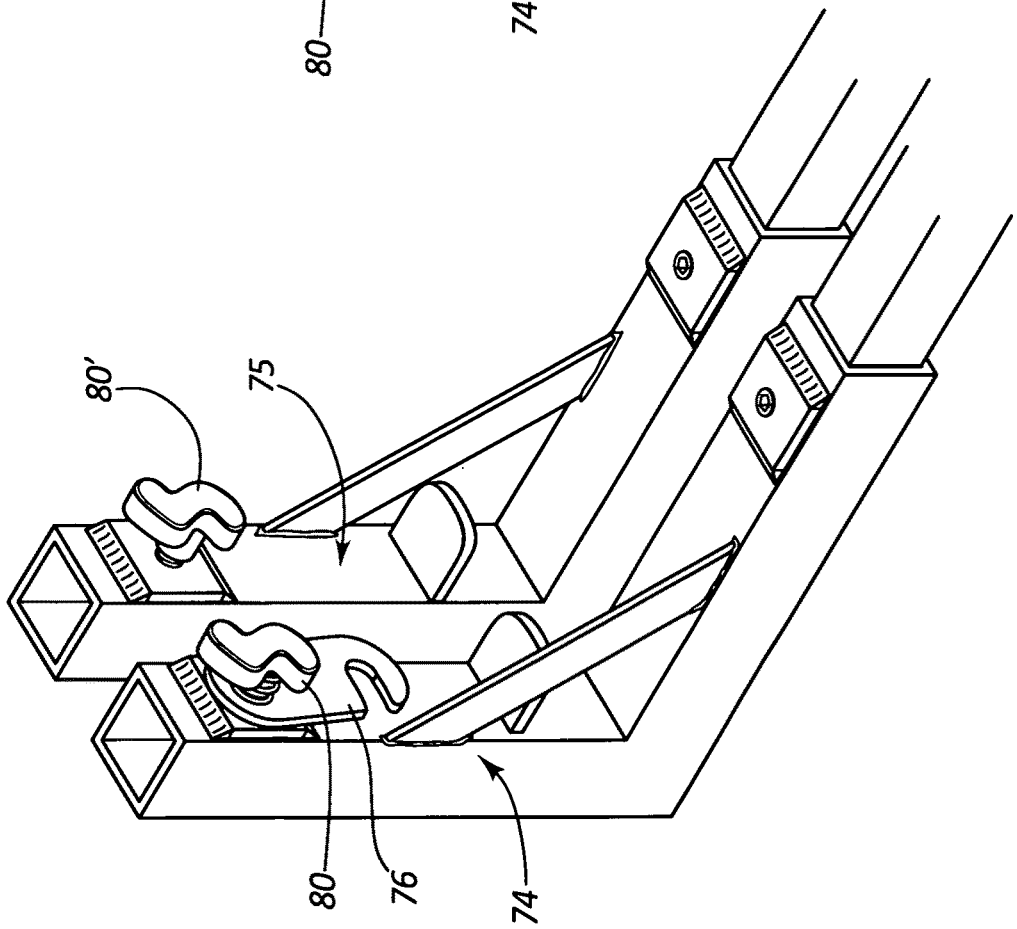
Figure 19:
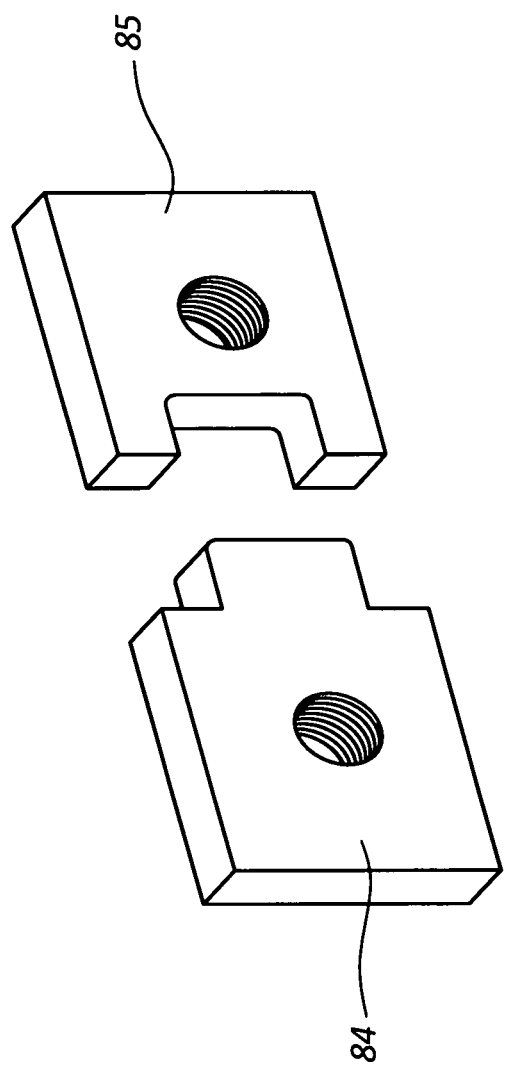
Figure 21:
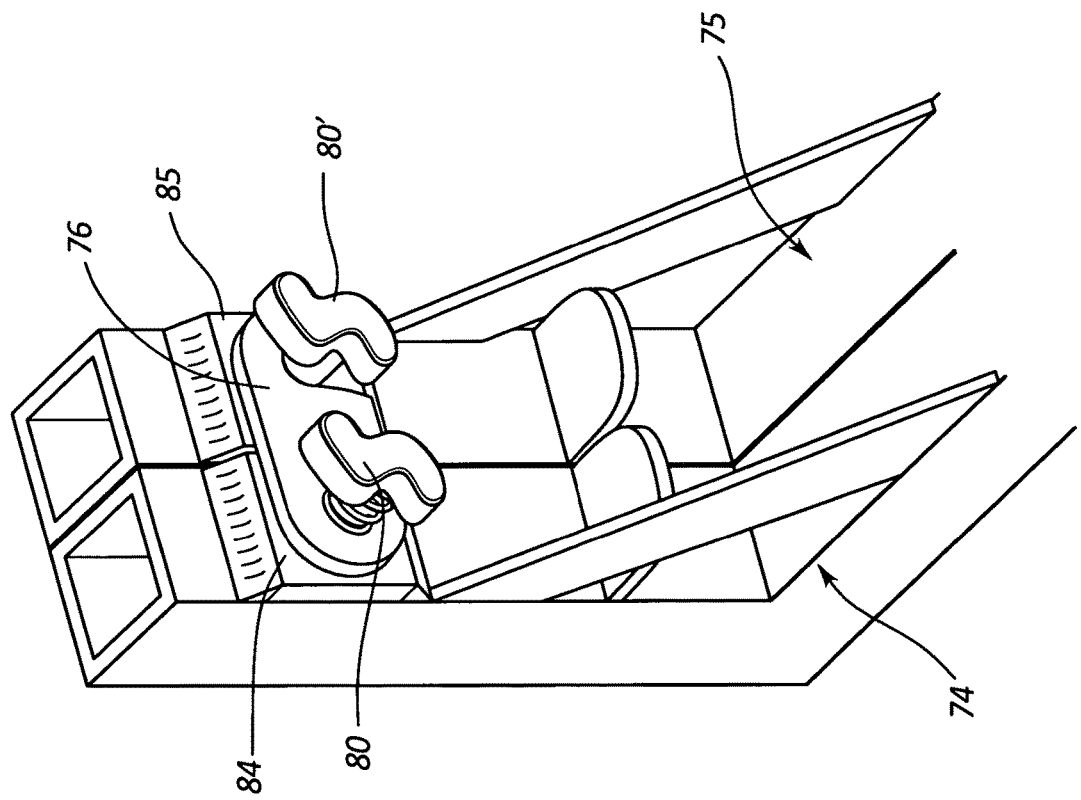
Figure 20:
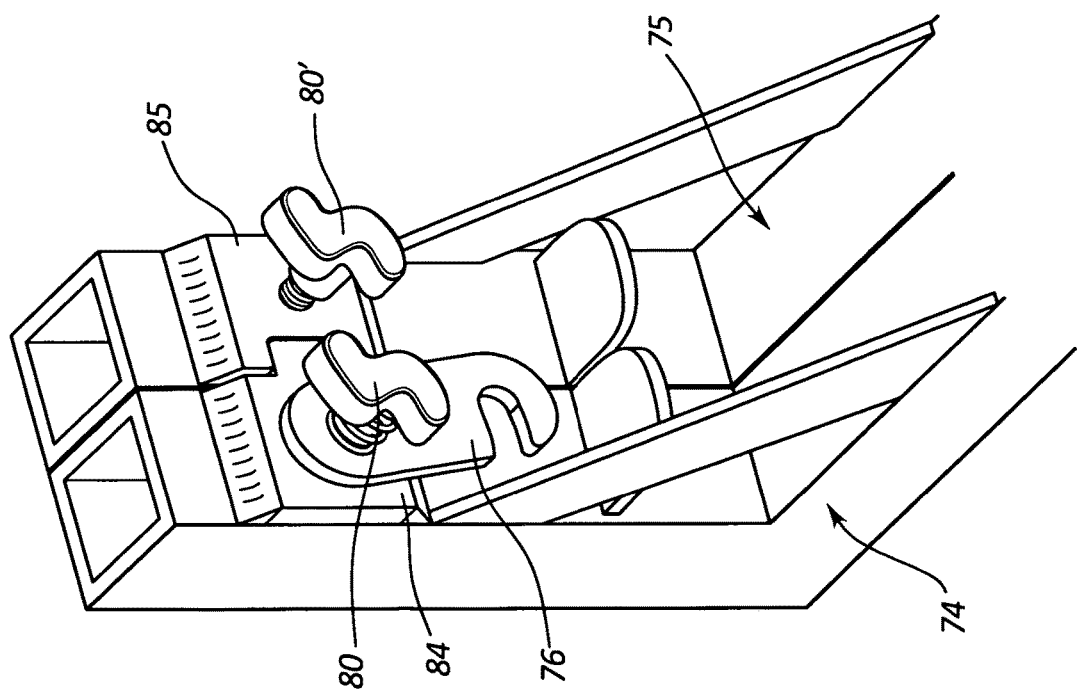
Figure 22:
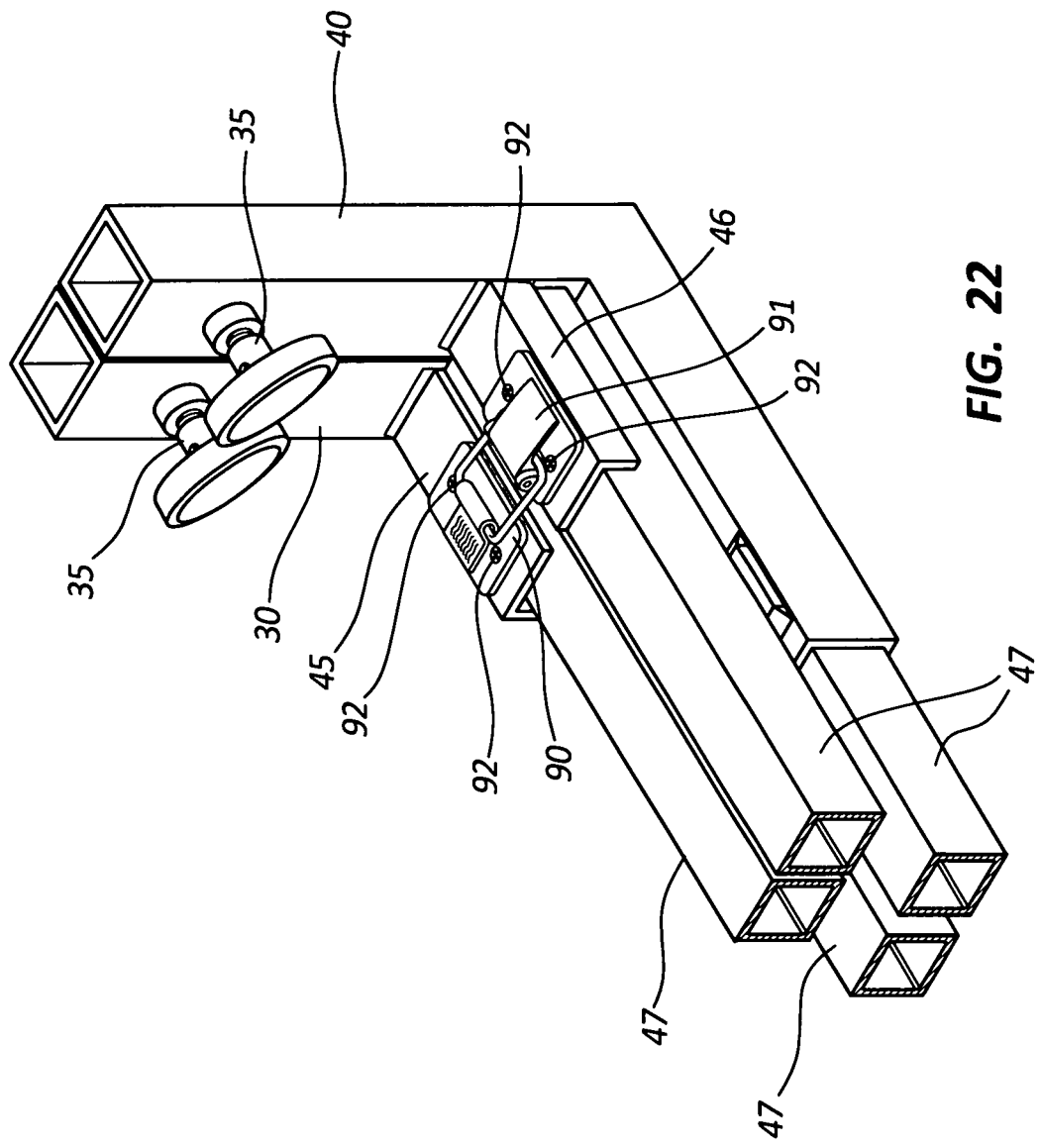

FIG. 1 Exploded view of preferred embodiment—with gussets
FIG. 2 Preferred embodiment—without gussets
FIG. 3 The present invention with all frame components in fully assembled configuration
FIG. 4 Frame which has been minimally disassembled into prime configuration
FIG. 5 Swing sides positioned between corners and under retainers
FIG. 6 Alpha orientation of frame components prior to latching
FIG. 7 Corner detail; frame bundled in alpha orientation prior to latching
FIG. 8 Corner detail; frame bundled and latched
FIG. 9a Prior art corner with perpendicularly oriented T-handle centerlines
FIG. 9b Prior art corner, side view, repositioned '1'-handles
FIG. 10a Prior art corner with perpendicular set screw and T-handle centerlines
FIG. 10b Possible set screw and T-handle orientations
FIG. 11 Prior Art, Matthew's® Hollywood™ Frame Corners, bundled, sides not shown
FIG. 12 Exploded view, alternative lower latch embodiment
FIG. 13 Detail, latch components, alternative lower latch embodiment
FIG. 14 Detail, corners prior to latching, alternative embodiment
FIG. 15 Detail, corners bundled and latched, alternative embodiment
FIG. 16 Exploded view, alternative upper latch embodiment
FIG. 17 Detail, alternative upper latch embodiment prior to latching
FIG. 18 Detail, alternative upper latch embodiment bundled and latched
FIG. 19 Alternative embodiment T-handle pads
FIG. 20 Detail, alternative T-handle pads engaged, corners ready to latch
FIG. 21 Detail, alternative T-handle pads engaged, corners latched
FIG. 22 Alternative embodiment latch member—corners with draw latch

DRAWING—REFERENCE NUMERALS

30 Latch Corner Assembly
31 Latch Retainer
31' Latch Retainer Bore
32 Bridge Component
32' Bridge Bores
33 Set Screw
34 T-Handle Nut
35 T-Handle Tension Bolt
36 Latch Member
36' Latch Bolt Bore
37 Latch Bolt—Shoulder Style
38 Spring Washer
39 Gusset
40 Strike Corner Assembly 41 Strike Retainer
41' Strike Retainer Bore
42 Threaded Stud
43 Latch Knob
44 Latch notch
45 Alternative Latch Retainer
46 Alternative Strike Retainer
47 Side-Reduced Length Not to Scale
48 Ear
49 Prior Art Corner
50 Prior Art Corner—reoriented T-handles
51 Prior Art Corner with Set Screw
52 Set Screw
52' Set Screw Nut
53 Potential Corner Embodiment
54 Matthews® Set Screw Nut
55 Matthews® Latch Screw Handle
56 Matthews® Latch Screw Retainer
57 Matthews® Latch Screw
58 Matthews® Latch Screw Nut
60 Latch Corner, Alternative Embodiment
61 Latch Retainer
61' Bore, Latch Screw Receptacle
61x Bore, Latch Bolt Receptacle
62 Latch Member
62a Latch Bolt Bore
62b Latch Screw Bore
63 Latch Bolt
64 Bushing
65 Latch Knob
66 Latch Knob Set Screw
67 Washer
67' Lap Weld
68 Latch Screw
70 Strike Corner, Alternative Embodiment
71 Strike Retainer
71' Strike Retainer Bore
74 Latch Corner, Upper Latch Embodiment
75 Strike Corner, Upper Latch Embodiment
76 Latch Member
76' Bore, Upper Latch Embodiment
77 Retainer, Upper Latch Embodiment
78 Gusset, Upper Latch Embodiment
79 T-Handle Bolt Pad
80 Mini T-Handle Latch Bolt
80' Mini T-Handle Latch Knob
81 Shoulder, Knob Style Tension Bolt
82 Latch Tension Spring
84 Alternative Set Screw-T-Handle Pad—Male
85 Alternative Set Screw-T-Handle Pad—Female
90 Draw Latch
91 Draw Latch Strike
92 Draw Latch Screws

DETAILED DECRIPTION—PREFFERED
EMBODIMENT, FIGS. 1, 2, 8

In FIG. 1, a latch corner 30 forms a pair with an adjacent strike corner 40. The pair is fabricated as mirror images of one another. Corners 30 and 40 are each constructed of two sections of square tubing welded at 90° to one another, thus comprising a vertical leg and a horizontal leg. Depending upon various manufacturers' preferences, gussets 39 may be welded diagonally between the two 90° legs in relative orientations as shown, or may be eliminated as in FIG. 2. Bridge components 32 are welded to both corner assemblies near the end of the horizontal legs' upper surfaces. Each bridge 32 comprises a planar surface of such minimum predetermined size to provide adequate stabilization of sides placed against it when in the alpha orientation. Bridges 32 are bored, with the bore 32' passing through both the bridge and the square tubing. Each bore is tapped to accommodate a set screw 33. T-handle nuts 34 are welded to both corner assemblies near the ends of the vertical legs' inner surfaces to accommodate T-handle tension bolts 35. The nuts 34 are positioned over bores, not shown, passing through the square tubing of both corner assemblies which allow bolts 35 to pass through the square tube.

Corners 30 and 40 are fitted with latch and strike retainers. For corners on which a manufacturer prefers gussets 39, as in FIG. 1, retainers 31 and 41 are constructed of a flat, rigid material having upper and lower horizontal faces, as shown. For corners on which a manufacturer prefers no gussets, as in FIG. 2, retainers 45 and 46 include a vertical extension having inner and outer vertical faces. The vertical extension of retainers 45 and 46 are of predetermined size to provide adequate lateral restraint of alpha-oriented swing sides 47 that are otherwise restrained by gussets.

Latch retainer 31 or 45, as applicable, is welded to corner 30 as in FIG. 1 or 2. The distance between the underside of latch retainer 31/45 and the upper square tube surface directly beneath the retainer is equal to or greater than the sum of the inside diameter of the square tube plus the thickness of bridge 32. Retainer 31/45 is bored and tapped to accommodate a latch bolt 37. Longitudinal centerline of bore 31' for bolt 37 is directly above longitudinal centerline of corner 30. Lateral centerline location of bore 31' from inner vertical cathetus of corner 30 is such that it accommodates the length of a latch member 36, described below, and operation of a latch knob 43 when latch 36 is perpendicular to retainer 31 as shown in FIG. 8.

Strike corner 40 is fitted with a strike retainer 41 or 46 as applicable and discussed above. Retainer 41/46 is welded to corner 40 as in FIG. 1 or 2. The distance between the underside of strike retainer 41/46 and the square tube surface directly beneath the retainer is equal to that of latch retainers above. Retainer 41/46 is bored and tapped to accommodate a stud 42. Longitudinal and lateral centerline of bore 41' for stud 42 is identical to that of bore 31' described above. Stud 42 is inserted into bore 41' at a depth no greater than the thickness of retainer 41/46 and is retained in position by acceptable means such as a chemical compound, or metallurgically, such as a tack weld. Latch knob 43 with internal threads is threaded onto stud 42. The latch knob 43 and stud 42 form a strike assembly.

Latch member 36, constructed of a section of flat, rigid material, is fastened to latch retainer 31 or 45, as appropriate, by latch bolt 37. Bolt 37 passes through spring washer 38, then through bore 36' in latch 36 and into threaded bore 31' in retainer 31/45. The diameter of latch bore 36' is equal to or greater than the diameter of the shoulder portion of bolt 37, allowing radial rotation of latch 36. The length of the shoulder portion of bolt 37 is equal to the thickness of latch 36 plus the height of spring washer 38 when washer 38 is compressed sufficiently to prevent unintended radial rotation of latch 36. Latch 36 is also notched, as shown. The center-to-center distance between bore 36' and the centerline of notch 44 is equal to the longitudinal center-to-center measurement between corners 30 and 40 when mated side-by-side in closest proximity, as in FIG. 8. The width of notch 44 is equal to or greater than the diameter of stud 42. Latch member 36, bolt 37, and the strike assembly form a latch assembly. The latch retainer, strike retainer, and latch assembly form the secondary fastener components.

OPERATION—FIGS. 3, 4, 5, 6, 7, 8

FIG. 3 shows a fully assembled overhead frame. To disassemble and bundle the frame, four T-handle bolts 35, one per corner, are loosened. In FIG. 4, with each corner's bolts 35 sufficiently loosened, two sides 47, with ears 48 still attached, are separated from the frame. In FIG. 5, sides 47 with ears 48 are placed between the corners and into the voids beneath retainers 31 and 41 (or 45 and 46, as applicable) of their respective corners, as shown.

In FIG. 6, all components are in alpha orientation prior to bundling and subsequent latching. FIG. 7 shows the proper orientation of components in greater detail, prior to latching. In FIG. 8, latch 36 has been pivoted onto stud 42 under knob 43. Knob 43 is then sufficiently tightened. The latching process is duplicated on the remaining pair of corners. Overhead frame assembly is the reverse of disassembly.

PREFERRED EMBODIMENT RAMIFICATIONS

Welding is mentioned throughout as a means of permanently joining various parts to construct a single component. Alternate means of consolidating components; including 3-D printing, injection molding, and CNC machining; may also be used. Non-metallic materials, such as carbon fiber, may also be used throughout.

For the present invention, the corners and sides are described as being constructed of square tube. These may be constructed of another profile or cross section, such as pipe or hexagonal tubing.

Stud 42 may be a shouldered stud of dual diameters. The smaller of the two diameters, having a thread length no greater than the thickness of the strike retainer, is threaded into strike retainer 41/46, thus limiting its depth of insertion into the retainer.

DETAILED DESCRIPTION—ALTERNATIVE LOWER LATCH EMBODIMENT—FIGS. 12, 13, 14, 15

FIG. 12 shows an exploded view of an alternative embodiment latch corner 60 and a strike corner 70 pair. The opposing pair of corners, not shown, is constructed as a mirror image of the pair seen in FIG. 12 in order to achieve proper operation. This creates four distinctly constructed corners.

Corners 60 and 70, including gussets 39, bridge components 32, set screws 33, T-handle bolts 35 and T-handle nuts 34 are constructed to the same specifications as the preferred embodiment.

With above components assembled to preferred embodiment specifications, latch corner 60 is then fitted with a latch retainer 61 and a latch member 62. Retainer 61 is welded to corner 60, as shown. The distance between the underside of retainer 61 and the square tube surface beneath retainer 61 is equal to or greater than the sum of the inside diameter of the square tube plus the thickness of set screw pad 32.

Latch 62 is fastened to retainer 61 by a latch bolt 63. A bore 62a, sized to receive a bushing 64, is positioned in latch 62. The inside diameter of bushing 64 accommodates outside diameter of bolt 63. Bolt 63 passes through bushing 64 in bore 62a, and threads into a tapped bore 61x of retainer 61. The height of bushing 64 prevents underside of head on bolt 63 from contacting latch 62, thus allowing radial rotation of latch 62. Bolt 63 and bushing 64 are members of the group identified as latch member attachment means.

Latch 62 is also fitted with a latch screw. A larger diameter threaded portion and a smaller diameter shaft portion make up the latch screw 68. Screw 68 passes through a bore 62b of latch 62 and into a tapped bore 61' of retainer 61 at a depth no greater than thickness of retainer 61. The length of the threaded portion of screw 68 is equal to or less than the thickness of retainer 61. Diameter of bore 62b is equal to or greater than the diameter of the threaded portion of screw 68. Bores 62a and 62b are collectively designated as attachment voids.

A washer 67 is positioned over the shaft portion of screw 68. The inside diameter of washer 67 is equal to or greater than the shaft portion diameter of screw 68, but less than the diameter of the threaded portion of screw 68. Washer 67 is centered over bore 62b and welded to latch 62 with an adequate number of lap welds 67', as in FIG. 1.3. A latch knob 65 and the latch screw 68 are components of the group identified as latch member attachment means. Knob 65, with an internal centerline bore, not shown, is positioned onto the upper shaft portion of screw 68. A set screw 66 is inserted into knob 65 and tensioned against the shaft portion of screw 68, securing knob 65 to screw 68. The length of the shaft portion of screw 68 is equal to the sum of the thicknesses of latch 62 and washer 67, plus the depth of the internal centerline bore in latch knob 65.

Strike corner 70, FIG. 12, is fitted with a strike retainer 71. Retainer 71 is welded to corner 70, as shown. The distance between the underside of retainer 71 and the square tube surface beneath retainer 71 is equal to or greater than the sum of the inside diameter of the square tube plus the thickness of bridge component 32. A bore 71' is drilled and tapped into retainer 71 to receive latch screw 68. The position of bore 71' is determined by bore 62b of latch 62 when corners 60 and 70 are in position to be latched. The centerline of bore 71' is identical to the centerline of bore 62b when latch 62 is pivoted into its final latched position, as shown in FIG. 15.

OPERATION—ALTERNATIVE EMBODIMENT LOWER LATCH; FIGS. 3, 4, 5, 6, 14, 15

Operation of the alternative embodiment is identical to that of the preferred embodiment until components are in side by side orientation, as shown in FIG. 6. FIG. 14 shows the proper orientation of alternative components in greater detail, prior to latching the bundle. Once components are in position, the latch knob 65 is unscrewed from latch retainer 61, and the latch 62 is pivoted into position above strike retainer 71. Knob 65 is tightened, threading latch screw 68, not seen, into retainer 71. The latching process is duplicated on the remaining pair of frame corners 60 and 70. Overhead frame assembly is the reverse of disassembly.

RAMIFICATIONS—ALTERNATIVE EMBODIMENT, LOWER LATCH

For the alternative embodiment lower latch, washer 67 may be eliminated by using a dual-diameter bore 62b in latch 62. One portion of this bore diameter is equal to or greater than the diameter of the threaded portion of screw 68. The remainder of the bore diameter is smaller than the diameter of the threaded portion of screw 68, but equal to or greater than the shaft portion of screw 68. Knob 65 and screw 68 may also be joined by means other than a set screw.

DETAILED DESCRIPTION—ALTERNATIVE EMBODIMENT, UPPER LATCH FIGS. 16, 17, 18

Corners 74 and 75; with gussets 78, bridge components 32, and set screws 33; are constructed to the same specifications as the preferred embodiment.

With above components assembled to preferred embodiment specifications, T-handle bolt pads 79 are welded to both corner assemblies, in locations as shown. Pads 79 are positioned at a distance which allows a latch 76, described below, unobstructed 360° rotation around a mini T-handle latch bolt 80 of corner 74. Pads 79 are bored, with bores passing through square tubing of both corners, and tapped to accommodate bolt 80 and threads of knob 80'.

Corners 74 and 75 are each fitted with a retainer 77. Retainers 77 are welded to each corner 74 and 75 as shown. The distance between the underside of retainer 77 and the square tube surface beneath retainer 77 is equal to or greater than the sum of the inside diameter of the square tube plus the thickness of bridge 32.

Latch 76 is fastened to latch corner 74 by the latch bolt 80, as shown. A threaded portion of bolt 80 first passes through a latch tension spring 82. The inside diameter of spring 82 is slightly greater than the diameter of the shoulder portion 81 of bolt 80 so spring 82 may rotate on shoulder 81. Spring 82 is of sufficient tension to exert a force against latch 76 to prevent unwanted radial movement when not latched. The compressed height of spring 82 is less than the length of shoulder 81. A bore 76' in latch 76 allows bolt 80 to pass through latch 76 and into pad 79 of corner 74, thus securing latch 76 to corner 74. The diameter of bore 76' is greater than the diameter of the threaded portion of bolt 80 and smaller than the diameter of the shoulder portion 81 of bolt 80.

Latch 76 is notched, as shown. The center-to-center distance between bore 76' and the notch centerline is identical to the center-to-center measurement between the bores of pads 79 when corners 74 and 75 are side-by-side in closest proximity. The width of the notch is equal to or greater than the diameter of a threaded portion of a latch knob 80' yet narrower than the shoulder portion 81. Mini T-handle latch bolt 80 and mini T-handle latch knob 80' are identical in size and composition but retain separate functions. As such, latch knob 80' is designated as a latch strike assembly. Latch bolt 80 and latch knob 80' are also components of the group identified as latch member attachment means. The notch of latch 76, described above, and bore 76' are collectively designated as attachment voids.

OPERATION—ALTERNATIVE EMBODIMENT UPPER LATCH, FIGS. 17, 18

FIG. 17 shows the components in relative position prior to latching. Latch bolt 80 of corner 74 and latch knob 80' of corner 75 are loosened. FIG. 18 shows corners latched. Latch 76 has been pivoted into position under latch knob 80' of corner 75. Latch bolt 80 and knob 80' are tightened, securing corners to one another.

ALTERNATIVE EMBODIMENT—IMPROVED T-HANDLE PADS—DETAILED DESCRIPTION—FIGS. 19, 20, 21

In FIG. 19, an alternative embodiment male pad 84 is shown. A tab projects from one edge of pad 84. On one edge of a female pad 85, a notch is formed. Said notch is of adequate size to mate in precise fashion with the tab of pad 84.

I claim:
1. Corner structures for overhead frames of the type that are well-known articles of trade, each of said corner structures comprising a length of tubular material formed into a right angle, said right angle comprising a vertical leg and a horizontal leg, the ends of said tubular material forming sockets oriented at 90° to one another, each of said sockets capable of receiving a side of an overhead frame, the improvement comprising secondary fastener components affixed to two of said corner structures, a first corner of said corner structures designated as a latch corner and a second corner of said corner structures designated as a strike corner, said secondary fastener components comprising a latch retainer, a strike retainer, and a latch assembly,

(a) said latch retainer comprising a first section of flat, rigid material having an upper face and a lower face, said latch retainer having a predetermined length and a width substantially equal to or less than the outside diameter of said horizontal leg of said latch corner and comprising a threaded bore therethrough at a predetermined location, said latch retainer permanently affixed to said vertical leg of said latch corner in an orientation that is parallel to said horizontal leg of said latch corner, said lower face oriented toward said horizontal leg and at such a distance away from said horizontal leg that a swing side may be placed between said lower face and the upper surface of said horizontal leg, (b) said strike retainer comprising a second section of flat, rigid material having an upper face and a lower face, said strike retainer having a predetermined length and a width substantially equal to or less than the outside diameter of said horizontal leg of said strike corner and comprising a threaded bore therethrough at a predetermined location, said strike retainer permanently affixed to said vertical leg of said strike corner in an orientation that is parallel to said horizontal leg of said strike corner, said lower face oriented toward said horizontal leg and at such a distance away from said horizontal leg that a swing side may be placed between said lower face and the upper surface of said horizontal leg, (c) said latch assembly comprising
  (1) a latch member, said latch member constructed of a third section of flat, rigid material of predetermined size and comprising a bore therethrough near one end of said third section and an elongated notch therethrough near the other end of said third section, said latch member being moveably fastened to said latch retainer by
  (2) a latch bolt, said latch bolt passing through said bore of said latch member and threadedly mating into said threaded bore of said latch retainer so that said latch member may be moved radially around the central axis of said bolt, said latch assembly also comprising
  (3) a strike assembly, said strike assembly comprising a threaded stud and a knob, said threaded stud comprising a lower end and an upper end, said lower end being threadedly mated into said threaded bore of said strike retainer so that said elongated notch of said latch member may radially engage said threaded stud when said latch corner and said strike corner are together positioned in an alpha orientation, said upper end of said threaded stud mated with said knob so that said knob may be tensioned against said latch member when said elongated notch of said latch member is engaged with said threaded stud, thus securing engagement of said latch member with said threaded stud and thereby rigidly joining said latch corner to said strike corner, whereby said alpha orientation of said overhead frames is maintained; protrusions extending beyond a distal rectangular periphery of an alpha-oriented frame are eliminated; the width of alpha-oriented components is reduced; and said overhead frames disassembled into a prime configuration may be quickly, efficiently, and rigidly bundled into said alpha orientation without the use of wasteful, cumbersome, and time-consuming materials.

2. The latch retainer and strike retainer of claim 1 each further including a vertical extension of predetermined size, said vertical extension comprising an inner vertical surface and an outer vertical surface, said vertical extension being affixed to the lower faces of said latch retainer and said strike retainer at each of the retainers' vertical edges which are nearest the outer periphery of said corner structures when said corner structures are in said alpha orientation whereby said swing side may be laterally as well as vertically restrained in said alpha orientation for applications in which a frame manufacturer preference has eliminated a gusset enhancement for overhead corners.

* * * * *